(12) United States Patent
Jasinski et al.

(10) Patent No.: US 7,199,884 B2
(45) Date of Patent: Apr. 3, 2007

(54) THIN THICKNESS MEASUREMENT METHOD AND APPARATUS

(75) Inventors: W. Ted Jasinski, Burnaby (CA); Frank M. Haran, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 241 days.

(21) Appl. No.: 11/018,631

(22) Filed: Dec. 21, 2004

(65) Prior Publication Data

US 2006/0132808 A1   Jun. 22, 2006

(51) Int. Cl.
G01B 11/06       (2006.01)

(52) U.S. Cl. ...................... 356/632; 356/429
(58) Field of Classification Search ........ 356/630–632, 356/429–431; 250/559.27, 559.22
See application file for complete search history.

(56) References Cited

U.S. PATENT DOCUMENTS

| | | | | |
|---|---|---|---|---|
| 3,536,405 A | * | 10/1970 | Flower ..................... | 356/631 |
| 3,802,774 A | * | 4/1974 | Eschler et al. ............. | 356/637 |
| 4,068,955 A | * | 1/1978 | Bodlaj ....................... | 356/631 |
| 4,160,204 A | | 7/1979 | Holmgren et al. .......... | 324/207 |
| 4,276,480 A | | 6/1981 | Watson ...................... | 250/560 |
| 4,708,483 A | | 11/1987 | Lorenz | |
| 4,773,760 A | * | 9/1988 | Makkonen .................. | 356/631 |
| 4,843,481 A | | 6/1989 | Plummer .................... | 358/296 |
| 5,210,593 A | * | 5/1993 | Kramer ...................... | 356/631 |
| 5,492,601 A | | 2/1996 | Ostermayer et al. ........ | 162/198 |
| 5,581,353 A | | 12/1996 | Taylor ....................... | 356/631 |
| 5,606,173 A | * | 2/1997 | Concannon et al. ..... | 250/559.3 |
| 5,694,214 A | | 12/1997 | Watanabe et al. .......... | 356/237 |
| 5,714,763 A | | 2/1998 | Chase et al. ............. | 250/559.3 |
| 6,038,028 A | * | 3/2000 | Grann et al. ............... | 356/630 |
| 6,100,986 A | * | 8/2000 | Rydningen ................. | 356/630 |
| 6,111,649 A | | 8/2000 | Tominaga et al. .......... | 356/381 |
| 6,281,679 B1 | | 8/2001 | King et al. ................. | 324/229 |
| 6,289,600 B1 | | 9/2001 | Watts ......................... | 33/542 |
| 6,297,879 B1 | | 10/2001 | Yang et al. .............. | 356/237.5 |
| 6,441,905 B1 | * | 8/2002 | Tojyo et al. ................ | 356/429 |
| 6,459,488 B1 | | 10/2002 | Heffner ...................... | 356/504 |
| 6,476,920 B1 | | 11/2002 | Scheiner et al. ............ | 356/630 |
| 6,494,446 B1 | | 12/2002 | Tomiyama et al. .......... | 271/91 |
| 6,515,746 B2 | | 2/2003 | Opsal et al. ................ | 356/369 |
| 6,556,306 B2 | | 4/2003 | Jiang et al. ................. | 356/517 |
| 6,573,999 B1 | | 6/2003 | Yang ......................... | 356/632 |
| 6,639,201 B2 | | 10/2003 | Almogy et al. .......... | 250/208.1 |

(Continued)

FOREIGN PATENT DOCUMENTS

EP       0 843 155 A1    5/1998

*Primary Examiner*—Hoa Q. Pham
(74) *Attorney, Agent, or Firm*—Munck Butrus, P.C.

(57) ABSTRACT

Techniques for non-contacting thickness or caliper measurements of moving webs or sheets employ a sensor device that includes a first sensor head and a second sensor head that are spaced apart to define a path through which the moving web travels. The sensor device projects a laser generated, multiple points pattern onto the upper surface of the moving web. Pattern recognition algorithm analysis of the pattern identifies the orientation, e.g., tilt, of the moving web. The device further measures the film tilt, the distance between the first sensor head and the first web surface, the distance between the second sensor head and the second web surface, and the distance between the two sensor heads to provide a highly accurate on-line thickness measurement of the moving web.

40 Claims, 3 Drawing Sheets

U.S. PATENT DOCUMENTS

| | | |
|---|---|---|
| 6,646,752 B2 | 11/2003 | Chen et al. .................. 356/630 |
| 6,690,357 B1 | 2/2004 | Dunton et al. .............. 345/158 |
| 6,700,370 B2 | 3/2004 | Chen et al. .................. 324/230 |
| 6,731,380 B2 | 5/2004 | Amara et al. ................. 356/73 |
| 6,744,052 B1 | 6/2004 | Petersson et al. ...... 250/370.11 |
| 6,757,069 B2 * | 6/2004 | Bowles ....................... 356/630 |
| 6,762,846 B1 | 7/2004 | Poris .......................... 356/609 |
| 2003/0007161 A1 | 1/2003 | Bowles |

* cited by examiner

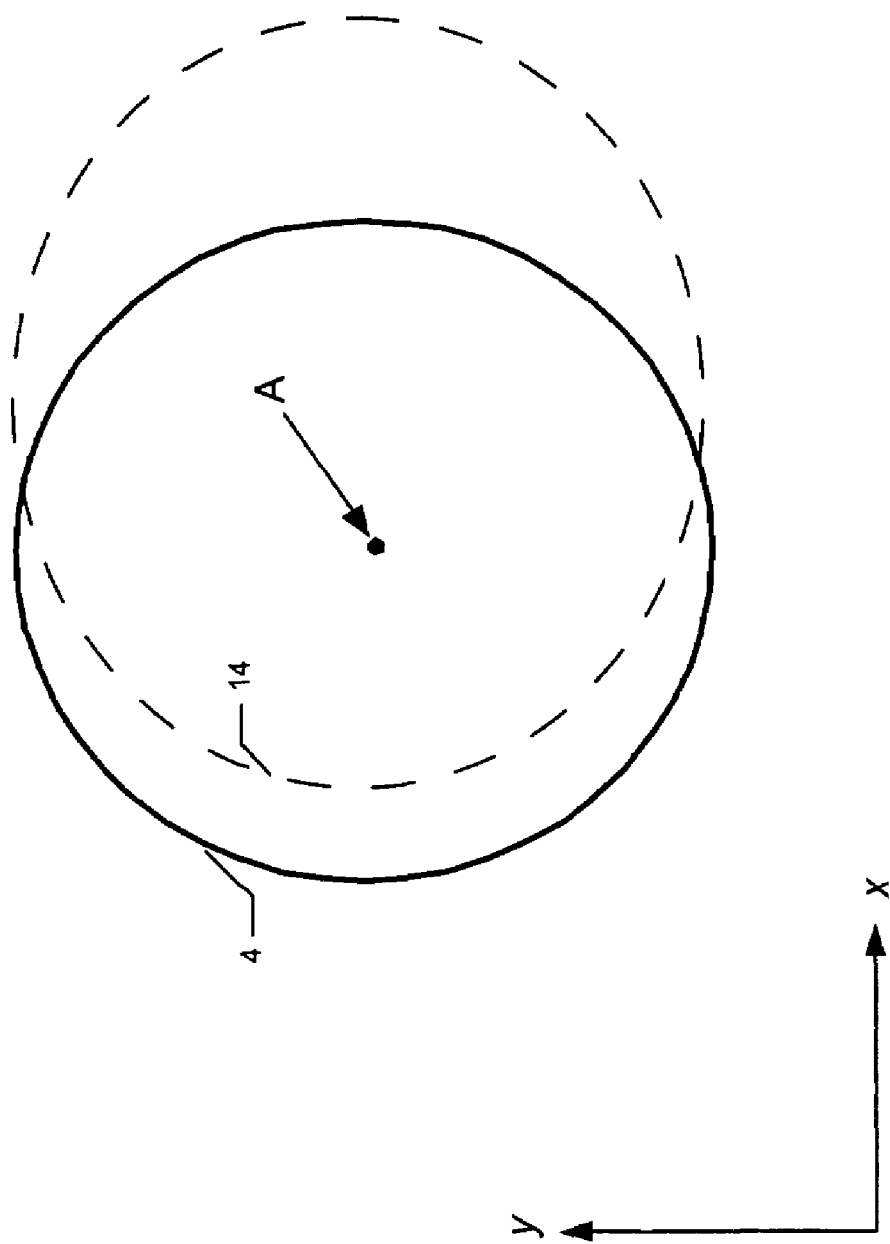

THIN THICKNESS MEASUREMENT METHOD AND APPARATUS

FIELD OF THE INVENTION

The present invention relates generally to techniques for non-contacting thickness or caliper measurements, and more particularly to a device that projects a laser generated, multiple points pattern onto the upper surface of a film which is moving along a path between two sensor heads that are vertically spaced apart. The device measures the film tilt, the distance between upper sensor head and the upper film surface, the distance between the lower sensor head and the lower film surface, and the distance between the two sensor heads to determine the thickness of the moving web.

BACKGROUND OF THE INVENTION

Numerous methods exist for measuring the thickness of a moving web or sheet, such as paper. Two of the most common techniques include a direct thickness measurement using contacting glides or shoes, which skim along the two surfaces of the web, and a non-contacting inferential method in which radiation absorption by the web is used to determine the weight per unit area of the web and the thickness is thereafter inferred, provided the density of the material is known with sufficient precision. Many variations and improvements to these methods exist, but each of the techniques has underlying drawbacks.

The contacting method is subject to three fundamental types of problems. First, the method can be limited by the strength of the material being measured. With fragile sheets such as tissue, for example, there is a tendency for the contacting shoes to snag deviations in the sheet surface, causing flaws in the sheet or even causing the sheet to tear. Second, the sheet itself can damage a contacting caliper sensor due either to abrasive wear on the contacting elements or to physical damage arising during sheet breaks. For caliper sensors that traverse the sheet, damage can also be caused when the sensor crosses the sheet edge. Third, the accuracy of contacting sensors can be adversely affected by the buildup of contaminants on the contacting elements, as may occur with coated or filled sheets or sheets containing recycled materials.

The non-contacting inferential thickness measurement methods avoid many of the problems of the contacting methods, but are subject to a new set of problems. For example, radioactive sources, which are common for thickness measurements when the density of the product is known, are not permitted in some web markets. Also the radioactive measurement is inferential, which means that if the density of the web is not as predicted, there may be significant errors in the calculated thickness value.

Several patents have suggested that use of lasers to measure the thickness of a moving web may be a promising option compared to the other methods available. One such system in U.S. Pat. No. 5,210,593 to Kramer and another such system described in U.S. Pat. No. 4,276,480 to Watson. In both these systems, the laser caliper apparatus comprises a laser source on either side of the web, whose light is directed onto the web surface and subsequently reflected to a receiver. The characteristics of the received laser signal are thereafter used to determine the distance from each receiver to the web surface. These distances are added together, and the result is subtracted from a known value for the distance between the two laser receivers. The result represents the web's thickness.

The above non-contacting approaches to thickness measurement have the desirable feature that they eliminate many of the disadvantages of the contacting method and the non-contacting inferential methods. However, there are difficulties with previous non-contacting techniques that can limit their use to relatively low-accuracy situations.

One of the problems is that the web may not always be perpendicular to the incident light, since the web has a tendency to bounce or develop intermittent wave-like motion. If the web is non-perpendicular to the incident light and the light beams from two opposing light sources are not directed to exactly the same spot on the sheet, substantial error in measurement can occur. This is caused by a number of factors. First, actual web thickness variations from the first laser's measurement spot to the second laser's measurement spot can cause an incorrect thickness measurement. Second, if the web is not perpendicular to the incident light, the measurement technique will cause an error in the thickness value proportional to the web's angle and to the displacement on the sheet surface between the two measurement spots. Bouncing or oscillation of the web can further exacerbate this error.

Another issue with the projection of laser light on to a paper or thin film is that the surface is usually not well defined and the paper or film is semi-transparent. Current laser triangulation sensors which use position sensitive detector such as Lateral Effect Detectors (LEP), Quad-cell or Bi-cell detectors contain insufficient information that is needed to extract the 'true' surface location of the surface.

Various minute changes in system geometry caused, in part, by thermal effects on physical dimensions of the measurement apparatus or by device calibration, can also degrade the measurement accuracy. These effects can be difficult to quantify directly, for example, by measuring temperatures at various points in the apparatus and applying appropriate correctors. These adverse effects become substantially more significant as the accuracy level of the measurement device approaches that required for the measurement and control of products such as newsprint or other thin products.

SUMMARY OF THE INVENTION

The present invention is based in part on the development of non-contact techniques for measuring the thickness of thin films especially traveling films that are less than one millimeter thick. The invention employs an optical sensor apparatus that has two sensor heads that are spaced apart to define a path through which the film is positioned. A pattern of known geometry is imaged onto a surface of the film and the image is analyzed with pattern recognition algorithm to determine the sensor head to film distance and the tilt of the film. Unlike prior art, the invention does not require extreme degrees of detection beam overlap to compensate for paper tilt, which is required for current approaches that employ single point laser distance measurements on both sides of paper sheet together with Z distance. The present approach also eliminates the need for tight tolerances on the laser beam alignment on both sides of measured sheet. A preferred method of forming the image is by projecting a laser beam pattern on one surface only and using the single spot laser on the other. Alternatively, another method is by projecting a separate laser beam pattern on each surface. A number of alternate methods known to those skilled in the art can be used to generate and to project laser patterns, e.g. lines, arrays of spots or circle, these include, for example, (a) diffractive optical elements (DOE), (b) acousto optical beam deflectors, (c) galvanometer driven scanning mirrors (galvomirror), and (d) bulk optical elements such as beam splitters, mirrors, and prisms.

In one embodiment, the invention is directed to a system, for measurement of the thickness of a web having a first surface and a second surface, that includes:

(a) a first sensor head that is disposed adjacent to the first surface of the web, wherein the first sensor head includes (i) means for generating and projecting an image onto the first surface of the web and (ii) means for detecting the image and converting the image into an electrical signal corresponding to an electronic image;

(b) means for analyzing the electronic image to determine the distance between the first sensor head and a selected location on the first surface of the web;

(c) a second sensor head that is disposed adjacent to the second surface of the web wherein the second sensor head includes means for measuring the distance from the second sensor head to a selected location on the second surface;

(d) means for measuring the distance from the first sensor head to the second sensor head; and (e) means for calculating the thickness of the web.

In another embodiment, the invention is directed to a non-contact method of measuring the thickness of a web having a first and a second surface, said method including the steps of:

(a) positioning a first sensor head adjacent the first surface of the web;

(b) positioning a second sensor head adjacent the second surface of the web;

(c) measuring the distance from the first sensor head to the second sensor head;

(d) projecting an image comprising a pattern on the first surface of the web;

(e) detecting and analyzing the image, using the local intensity maximum to define the image, to determine the orientation of the web surface relative to the first sensor head, second sensor head, or both;

(f) detecting and analyzing the image, using the local intensity maximum to determine the distance between the web surface and the first sensor head;

(g) measuring the distance from the second sensor head to a position on the second surface of the web;

(h) measuring the distance offset in a direction perpendicular to the line defining the distance between the first, (upper) and second (lower) sensor heads; and (i) calculating the thickness of the web.

BRIEF DESCRIPTION OF THE DRAWINGS

FIG. 3 illustrates the plan views of patterns that are projected onto the upper surface of a moving sheet.

DETAILED DESCRIPTION OF THE PREFERRED EMBODIMENTS

Figure 1:
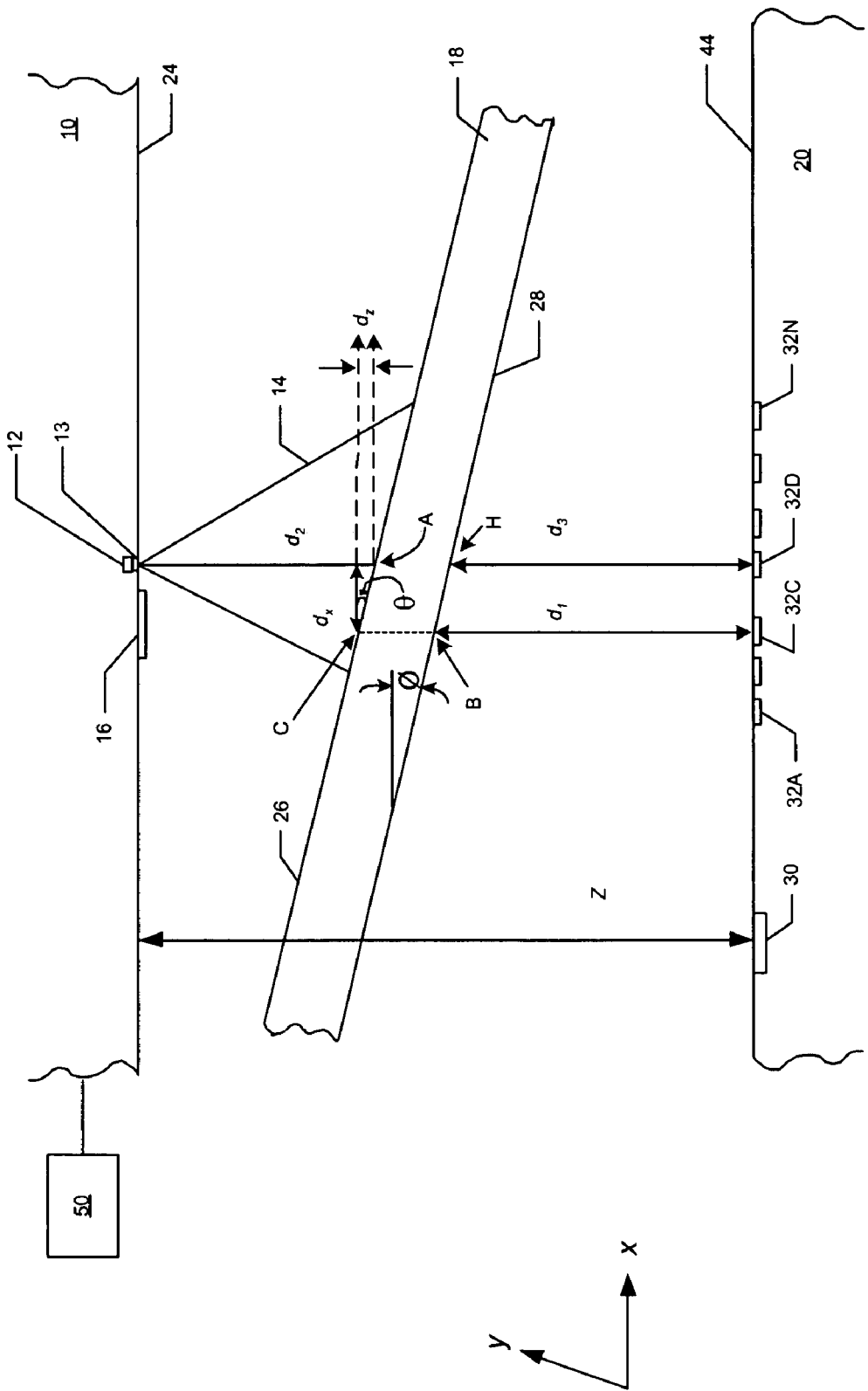
FIGS. 1 and 2 are cross sectional views of the non-contact thickness measuring apparatus; and modified

As shown in FIG. 1, a non-contact web or sheet thickness measurement device of the present invention includes first and second enclosures or heads 10 and 20, respectively, which are vertically spaced apart. Surface 24 and surface 44 are preferably parallel to each other and are separated from each other by a distance that is denoted Z. Each sensor head includes various optical sensors for measuring selected dimensions as further described herein. A web 18 that is positioned between the sensor heads moves linearly in the direction of the y-axis. Due to the difficulty of mechanically constraining the moving web, the web 18 does not necessarily move along in a straight line that is parallel to the planar surfaces 24, 44. In this example, the web 18 is tilted; the angle between the upper or first surface 26 of the web 18 and the x-axis is denoted θ. Generally the top and bottom planar surfaces of the web are parallel to each other so that the angle θ made with the top surface is the same as the angle φ made with the bottom surface.

The first head 10, which is positioned above the first surface 26 of the web 18, includes a laser source 12 and pattern forming optics 13 that project an image 14 onto the first surface 26 of the web 18. The image 14 can be any pattern including, for example, geometric figures, lines, crosses, groups of points, and the like. A number of alternate methods known can be used in the pattern forming optics 13 to generate and to project laser patterns, e.g., lines, arrays of spots, or circle. The pattern forming optics 13 could include, but are not limited to:

(a) Diffractive optical elements (DOE), wherein the pattern is generated by the diffraction of the transiting laser beam to predetermined angles, such as those that can be obtained from MEMS Optical (Huntsville, Ala.) or Stoker Yale (Salem, N.H.).

(b) Acousto optical beam deflectors, wherein the pattern is generated by the diffraction of the transiting laser beam and where the diffracted angles can be dynamically adjusted by using suitable driving electronics, such as those from Isomet (Springfield, Va.).

(c) Galvanometer driven scanning mirrors (galvomirror) wherein the pattern is generated by the reflection of the laser beam to predetermined angles by mirrors actuated by a galvanometer driven by suitable controlling electronics, such as those from Cambridge Technology (Cambridge, Mass.), or Nutfield Technology (Nutfield, N.H.).

(d) Bulk optical elements that include, for example, beam splitters, mirrors, and prisms.

In general, only three distinct points need to be measured and analyzed to determine the spatial orientation and distance of the web first surface 26 relative to the first sensor plane 24. One pattern that can be generated and projected, for example, is the circle formed by the intersection of the projected light cone with a suface perpendicular to the cone axis. The circle's diameter is directly proportional to the distance from the source and the surface and it transforms to an ellipse when projected on a tilted surface or when viewed from an off-axis position. The mathematical equation for the ellipse is simple and can be implemented with curve fitting algorithm relatively easily. An imaging detector 16, such as a solid-state video camera, detects the image 14 and converts the image into electrical signals corresponding to an electronic image. Suitable imaging detectors are silicon charge coupled device (CCD) cameras or a Complementary Metal Oxide Semiconductor (CMOS) camera. A computer system 50, which is electrically connected to the detector 16, includes pattern recognition software to process the electronic images as further described herein.

The second head 20, which is positioned below the lower or second surface 28 of the web 18, has a laser distance sensor, which measures the distance from head 44 to the surface 28 of the web 18. The projected dot, which is point "C" on the surface 26, should be in view of the detector 16, which allows the offset distance ($d_x$) between the upper and lower projection axes in the plane of the sensor to be calculated. (The offset distance can also be referred to as the misalignment of the top and bottom heads.) This offset distance is used in the calculation of the web thickness as described herein. An alternative method for obtaining the XY head misalignments is to use a magnetoresistor bridge network which is available as the Honeywell XY-sensor part number 08696700 from Honeywell International (Morristown, N.J.). This device is particularly suited for measurements of thick or opaque products such as board or metal. In this example, as illustrated in FIG. 1, vertical distance sensor 32C measures the vertical distance ($d_1$) to point "B" on the lower surface 28 of the web 18. The vertical distance sensor can be a conventional laser triangulation sensor that has, for example, a solid-state laser source that is able to emit a laser beam onto a point on the lower surface 28 and a detector that is located at an oblique angle that images the laser spot from the point and measures its reflected angle. Such sensors are available from Keyence Corporation of Osaka, Japan. Sensors 32A through 32N represent possible alternative sensor positions that are within the field of view of detector 16. There is preferably a single sensor on the lower head 20. To distinguish between the patterns projected by the laser in the first head 10 from those by the laser in the second head 20, pattern recognition capability can be designed into the analysis software. Alternatively, the lasers can be selected to operate at two distinct wavelengths, or as a further alternative, they can be cycled on and off alternately by the electronics and software controlling the image acquisition and analysis.

In order to determine angle θ, which changes with the orientation of the web, the computer system 50 includes pattern recognition software that continuously analyzes the projected pattern 14 that is detected by the imaging sensor. Since the detected image of the projected pattern 14 includes light that has penetrated into the typically translucent web material and subsequently backscattered and rescattered until it exits the surface in the direction of detector 16, the dimensions of any line or spot in the detected image will be greater than that actually projected onto the upper surface 26 of the web 18. This source of measurement error can be reduced by the use of mathematical curve fitting algorithms to define the positions of maximum intensity across the intensity profiles of the pattern elements, i.e., the maxima of the intensity distribution in the direction perpendicular to a line or across the disk of a spot. These positions form the locus of the projected pattern at the surface 26 of web 18 since they represent positions where no multiple scattering events have occurred. The software uses mathematical curve fitting algorithm or it can compare the images to patterns that are stored in a library to determine the angle θ. Specifically, the software uses correlation functions to compare the actual, acquired image 14 to reference data of representative of images and their corresponding tilt angles. The library can be created experimentally by projecting a laser-generated pattern onto a film and maneuvering the film to change its orientation. Specifically, the film is maneuvered through a wide range of tilt angles and their corresponding patterns are detected. Both the angles and corresponding patterns are recorded. Alternatively, the library can be created with mathematical modeling techniques, e.g., calculating the projected patterns for given tilt angles, to create a set of patterns representing the geometry of the patterns at different tilt angles.

As is evident from FIG. 1, the size of the image 14, which is projected onto surface 26, depends on the distance between pattern forming optics 13 and the web 18. Thus, should the web 18 drift closer toward the second sensor head 20, the cross sectional area of the image 14 that is projected onto surface 26 would increase. The library to which the pattern recognition program can access can also include data that correlates specific pattern images to distances between the first sensor head and the upper surface 26 of the web 18, such as the vertical distance $d_2$, which is between the pattern forming optics 13 and the upper surface 26. The data for this library can be collected experimentally or generated by mathematical modeling as well.

As is apparent from FIG. 1, given that surface 24 of the first sensor head and the surface 44 of the second sensor head are parallel the tilt angle can be measured relative to either surface. For convenience, the term "tilt angle" measures the angle between the plane defined by the surface of the web on which an image is projected and a plane that is defined by the sensor head that is disposed adjacent the surface. In this case of the thickness measurement device of FIG. 1, the tilt angle is measured relative to surface 24 of the first sensor head 10 and to the upper surface 26 of the web 18. The tilt angle is zero when surface 24 of the first sensor head is parallel to upper surface 26 of the web 18.

FIG. 3 illustrates a plan view of the web upper surface 26 of a circular pattern that is projected onto the upper surface 26 of the web 18 by the pattern forming optics 13 of FIG. 1. Pattern 4 is created when the angle θ is zero, that is, when the upper surface 26 of the web 18 is parallel to the sensor surface 24. As is apparent, the circular pattern is symmetrical and point "A" corresponds to the geometric center. Pattern 14, which is skewed relative to pattern 4, is created when the upper surface is tilted. In other words, the circular pattern 4 is transformed into pattern 14 when surface 26 is tilted. As is evident from FIG. 1, the size of image 14 that is projected onto the upper surface 26 is also proportional to distance between the pattern forming optics 13 and point A on the upper surface of the web 18 immediately below, which is designated $d_2$. The size of the projected image 14 decreases as $d_2$ decreases and the size increases as $d_2$ increases. Thus, when the computer 50 compares the projected images to those in its library, the comparison will provide the angle θ and $d_2$. As is apparent, when the viewing axis is other than normal to the web upper surface 26, the circular pattern 4 in FIG. 3 appears to be elliptical and the geometric center will be at the intersection of the major and minor axes of the ellipse. The analysis for distance and orientation can be performed after a simple transform of the image data for sensor viewing angle or, alternatively, the distortions induced by the non-normal viewing angle can be included in the library.

FIG. 1 illustrates the non-coincident geometry of the projection axes (the line along which the light travels) of the pattern forming optics 13 of the sensor head 10 and laser 32C of the sensor head 20. The horizontal distance by which they are out of coincidence is designated $d_x$ in FIG. 1. The laser spot projected by the laser triangulation sensor 32C on head 20 to point "B" on the lower surface 28 of the web 18 will be visible on the upper surface 26 of web 18 if the web is sufficiently optically thin, e.g., as will be the case with light weight coated (LWC) paper or newsprint. The distance $d_x$ is then measured with the imaging sensor by locating the intensity maximum of the projected laser spot from sensor 32C on upper surface 26 in the image and calculating the separation between the projected laser spot and the projection axis of pattern forming optics 13 of the first sensor head 10. Pattern recognition capability can be designed into the analysis software to distinguish between the pattern projected from the upper head 10 and the pattern projected from the lower head 20. Alternatively, the laser sources can be selected to operate at two different wavelengths with a color sensitive sensor. Further alternatively, the laser sources can be selectively switched on and off by the image acquisition control electronics and software. The position of the projection axis of pattern forming optics 13, of the first sensor head 10, is designated by the calculated point "A" on the image of the upper surface 26 of web 18 as described above. An alternate method for obtaining the XY offset of the upper and lower laser head would be to use a magnetoresitive sensor such as a Honeywell model number 08696700. This method does not restrict use to measurements on optically thin materials.

As further illustrated in FIG. 1, the vertical distance between the first sensor head 10 and the second sensor head 20 is designated Z, which can be accurately measured prior to the start of operations of the non-contact thickness measurement apparatus. If Z remains constant throughout operations, further measurements are unnecessary. However, the separation between the two sensor heads can vary slightly due to thermal expansion, vibrations, and other factors, thus, dynamic measurement of the spacing between the sensor heads is preferred for precise measurements. Various techniques can be employed for dynamic measurement including, for example, RF source and receiver coils, Hall devices, and magnetoresistive devices. A sensor that employs electromagnetic induction is described in U.S. Pat. No. 4,160,204 to Holmgren et al., which is incorporated herein by reference. Another preferred Z sensor is a RF coil system on sensor 10 inducing geddy currents into the opposite sensor head 20 and measuring the impedance of the system to obtain an indication of the distance Z. The dynamic vertical distance sensor 30 is shown to be incorporated in the second header 20 but it is understood that the sensor 30 may be placed elsewhere or that the sensor may include multiple components that are placed in both headers 10, 20 or elsewhere.

While not necessary to the practice of the invention, in order to stabilize the moving web as it approaches the sheet thickness measurement device, it may be preferred to employ a web stabilizer upstream from the measurement device. Suitable non-contact stabilizers include air clamp stabilizers for continuous web materials that are described in U.S. Patent Application 2003/0075293 to Moeller et al. which is incorporated herein by reference. The stabilizer prevents large fluctuations in the web tilt and also assures that the moving web does not impinge on either of the sensor heads of the measurement device. The present invention will reduce the tolerance requirements on these types of devices.

In operation, as shown in FIG. 1, as the web 18 traverses between the sensor heads 10 and 20, an image 14 is projected onto the upper surface 26 of the web 18. Thereafter, Z, $d_1$, $d_2$, $\theta$ and $d_x$ are measured by the methods described above. The thickness of the web 18, can be calculated from the following equation:

$$\text{Thickness}=(Z-(d_1+d_2))*\cos \theta + d_x*\sin \theta.$$

FIG. 1 also illustrates another embodiment of measuring the thickness of the web 18 wherein the distance of $d_x$ is not required and that occurs when vertical distance measurements are taken along the same axis. For example, when $d_1$ and $d_3$ are measured, the thickness of the web 18 is simply equal to $(Z-(d_2+d_3))*\cos \theta$. This can be achieved by closed loop control of the projection axis of the pattern forming optics 13 and the information from the imaging detector. The beam steering can be accomplished by readily available beam steering devices such as a 2-dimensional galvanometer driven scanning mirror assembly and ancillary optics, a 2-D acousto optical scanning assembly and ancillary optics, or, alternatively, by simply physically moving the head.

Figure 2:
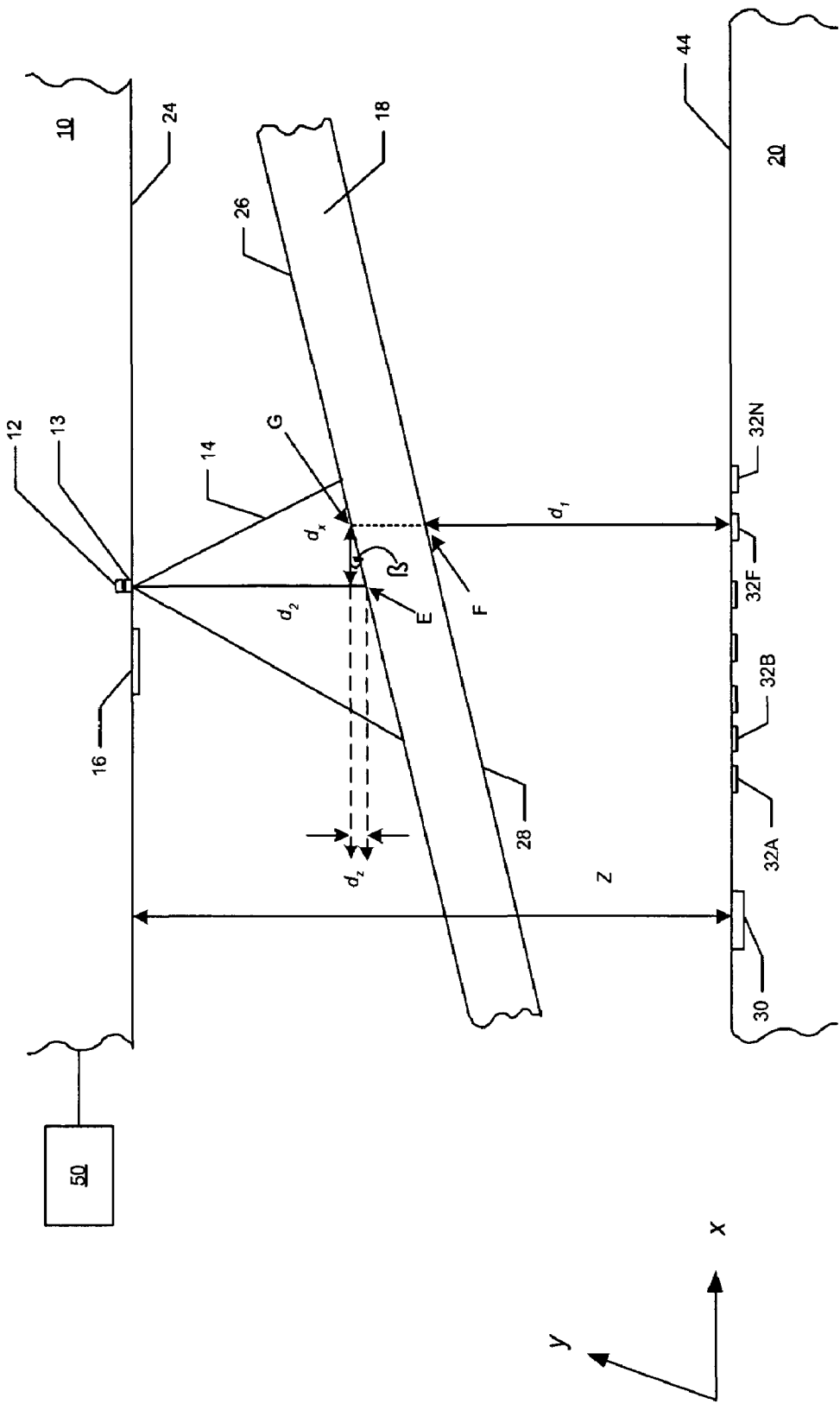

FIG. 2 illustrates the situation where the web 18 is tilted in another direction. As shown the web 18, that is positioned between the sensor heads 10, 20, moves along in the direction of the y-axis. The angle between the upper surface 26 of the web 18 and the x-axis is denoted β. The device measures variable Z, $d_1$, $d_2$, θ and $d_x$ as before however in this embodiment, it is preferred that points "G" and "F" be employed. Specifically, $d_1$ is measured with vertical distance sensor 32N.

While the advantages of the film thickness measurement device have been illustrated in association with the manufacture of paper, it is understood that the device can be employed in any environment where the thickness of a moving web of material must be determined. For example, the thickness measurement device can be readily implemented in the manufacture of plastics and fabrics. The device is particularly suited for measuring films that range from 10 to 1000 μm in thickness. The films can travel at high speeds typically ranging from about 800 m/min. to 2100 m/min. or faster.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A system for measurement of a thickness of a web having a first surface and a second surface, comprising:
   a first sensor head that includes (i) means for projecting a pattern onto the first surface of the web and (ii) means for detecting an image of the projected pattern and converting the detected image into an electrical signal corresponding to an electronic image;
   means for analyzing the electronic image to determine a distance between the first sensor head and a first selected location on the first surface of the web;
   a second sensor head that includes means for measuring a distance from the second sensor head to a second selected location on the second surface of the web;
   means for measuring a distance from the first sensor head to the second sensor head;
   means for measuring a tilt angle of the web;
   means for measuring a relative misalignment of the first and second sensor heads; and
   means for calculating the thickness of the web using the tilt angle of the web and the relative misalignment of the first and second sensor heads.

2. The system of claim 1 wherein the means for detecting the image comprises a detector that is arranged adjacent to the first surface in order to detect the image; and
   wherein the means for analyzing the electronic image comprises a computer system that is electrically connected to the detector and that includes a pattern recognition program to process the electronic image and to determine an orientation of the web.

3. The system of claim 2 wherein the means for detecting the image comprises a charge couple device sensor camera.

4. The system of claim 2 wherein the means for detecting the image comprises a CMOS sensor camera.

5. The system of claim 1 wherein the means for projecting the pattern includes a diffractive optical element.

6. The system of claim 1 wherein the means for projecting the pattern includes an optical element that comprises at least one of a beam splitter, a mirror, and a prism.

7. The system of claim 1 wherein the means for projecting the pattern includes at least one of an acousto-optical deflector and a galvanometer driven mirror.

8. The system of claim 2 wherein the first sensor head has a first operative planar surface that faces the first surface of the web; and
wherein the pattern recognition program is capable of determining the tilt angle, if any, between the first surface of the web and the first operative planar surface.

9. The system of claim 1 wherein the pattern that is projected on the first surface of the web has a defined profile; and
wherein the first sensor head further comprises (i) means for measuring a vertical distance from a first location on the first sensor head to a position on the first surface of the web that is situated vertically along a first vertical axis and (ii) means for measuring a horizontal distance from a reference point on the first surface of the web to the first vertical axis.

10. The system of claim 9 wherein the means for projecting the pattern includes an image source; and
wherein the means for measuring the vertical distance is capable of measuring a distance from the image source to the position on the first surface of the web that is situated vertically along the first vertical axis, the image source located along the first vertical axis.

11. The system of claim 10 wherein the means for measuring the vertical distance comprises a laser triangulation sensor.

12. The system of claim 9 wherein the means for measuring the distance from the second sensor head to the second selected location on the second surface of the web is capable of measuring a vertical distance from the second sensor head to a location on the second surface that is on the first vertical axis and is co-axial with the reference point.

13. The system of claim 1 wherein the means for measuring the distance from the second sensor head to the second selected location on the second surface of the web comprises at least one vertical distance sensor.

14. The system of claim 13 wherein each vertical distance sensor comprises a laser triangulation sensor.

15. The system of claim 1 wherein the means for measuring the distance from the first sensor head to the second sensor head is a sensor that has an accuracy of better than 10 µm.

16. The system of claim 1 wherein the means for calculating the thickness of the web comprises a computer.

17. The system of claim 1 wherein the first sensor head is an upper sensor head and the second sensor head is a lower sensor head; and
wherein the means for measuring the relative misalignment is capable of measuring an offset distance between upper and lower projection axes in a plane of sensors of the upper and lower sensor heads with a magnetoresistive displacement sensor.

18. The system of claim 1 wherein the first sensor head is an upper sensor head and the second sensor head is a lower sensor head; and
wherein the means for measuring the relative misalignment is capable of measuring an offset distance between upper and lower projection axes in a plane of sensors of the upper and lower sensor heads by taking a transmitted image of a lower laser spot through the web and detecting it with an imaging sensor.

19. The system of claim 1 wherein the pattern projected by the first sensor head is differentiated from a pattern generated by the second sensor head.

20. The system of claim 1 wherein the web is made of material that is selected from the group consisting of paper, plastics, metal foils, and coated films.

21. The system of claim 20 wherein the means for measuring the distance from the second sensor head to the second selected location comprises a laser triangulation sensor; and
wherein the web is sufficiently thin that a laser beam from the laser triangulation sensor penetrates through the web.

22. The system of claim 1 wherein the first sensor head has a first operative planar surface and the second sensor head has a second operative planar surface that is substantially co-planar with the first operative planar surface.

23. The system of claim 22 wherein the first surface of the web is a top surface that faces the first operative planar surface and the second surface of the web is a lower surface that faces the second operative planar surface.

24. A non-contact method of measuring a thickness of a web having a first surface and a second surface, said method comprising the steps of:
positioning a first sensor head adjacent to the first surface of the web;
positioning a second sensor head adjacent to the second surface of the web;
measuring a distance from the first sensor head to the second sensor head;
projecting an image comprising a pattern on the first surface of the web;
detecting and analyzing the image to determine an orientation of the web relative to at least one of the first sensor head and the second sensor head;
measuring a distance from the second sensor head to a position on the second surface of the web;
measuring a relative misalignment of the first and second sensor heads; and
calculating the thickness of the web using the orientation of the web and the relative misalignment of the first and second sensor heads.

25. The method of claim 24 wherein the step of detecting and analyzing comprises comparing the detected image with one or more reference images to determine the orientation of the web.

26. The method of claim 24 wherein the step of detecting and analyzing employs a charge couple device camera to detect the image and to convert the detected image into an electrical signal corresponding to an electronic image.

27. The method of claim 24 wherein the step of detecting and analyzing employs a CMOS camera device to detect the image and to convert the detected image into an electrical signal corresponding to an electronic image.

28. The method of claim 24 wherein the step of detecting and analyzing comprises employing a pattern recognition program that compares the detected image to one or more reference images to determine a tilt angle of the web.

29. The method of claim 28 wherein the first sensor head has a first operative planar surface that faces the first surface of the web; and
wherein the pattern recognition program determines the tilt angle, if any, between the first surface of the web and the first operative planar surface.

30. The method of claim 24 wherein, in the step of projecting, the image that is projected on the first surface of the web has a defined profile; and wherein the method further comprises the steps of: (i) measuring a vertical distance from a first location on the first sensor head to a position on the first surface of the web that is situated vertically along a first vertical axis and (ii) measuring a horizontal distance from a reference point on the first surface of the web to the first vertical axis.

31. The method of claim 30 wherein a laser is used for projecting the image onto the first surface of the web; and
wherein measuring the vertical distance measures a distance from the laser to the position on the first surface of the web that is situated vertically along the first vertical axis, the laser located alone the first vertical axis.

32. The method of claim 24 wherein the step of projecting comprises generating a projected pattern with a diffractive optical element.

33. The method of claim 24 wherein the step of projecting comprises generating a laser pattern with an optical element that comprises at least one of a beam splitter, a mirror, and a prism.

34. The method of claim 24 wherein the step of projecting comprises generating a laser pattern with an active optical device that comprises at least one of an acousto-optical deflector a galvanometer driven mirror.

35. The method of claim 24 wherein the step of measuring the distance from the first sensor head to the second sensor head employs a laser triangulation sensor.

36. The method of claim 24 wherein the step of measuring the distance from the second sensor head to the position on the second surface of the web comprises measuring a vertical distance from the second sensor head to a location on the second surface.

37. The method of claim 24 wherein the step of measuring the distance from the second sensor head to the position on the second surface of the web comprises employing at least one vertical distance sensor.

38. The method of claim 37 wherein each vertical distance sensor comprises a laser triangulation sensor.

39. The method of claim 24 wherein the step of measuring the distance from the first sensor head to the second sensor head has an accuracy of better than 10 μm.

40. A system, comprising:
a first sensor head that is operable to project a pattern onto a first surface of a web and to detect an image of the projected pattern;
a second sensor head that is operable to measure a distance from the second sensor head to a position on a second surface of the web; and
at least one analyzer operable to:
determine a tilt angle of the web using the detected image;
determine a relative misalignment of the first and second sensor heads; and
determine the thickness of the web using the tilt angle of the web and the relative misalignment of the first and second sensor heads.

* * * * *

UNITED STATES PATENT AND TRADEMARK OFFICE
CERTIFICATE OF CORRECTION

| | |
|---|---|
| PATENT NO. | : 7,199,884 B2 |
| APPLICATION NO. | : 11/018631 |
| DATED | : April 3, 2007 |
| INVENTOR(S) | : W. Ted Jasinski et al. |

It is certified that error appears in the above-identified patent and that said Letters Patent is hereby corrected as shown below:

In Column 11, line 13, delete "alone" and add --along--.

Signed and Sealed this

Thirty-first Day of July, 2007

JON W. DUDAS
*Director of the United States Patent and Trademark Office*